(12) United States Patent
Deng et al.

(10) Patent No.: US 12,038,096 B1
(45) Date of Patent: Jul. 16, 2024

(54) CHOKE COMBINATION DEVICE FOR GAS PRODUCTION

(71) Applicants: Sichuan Hongda Security Technology Service Co., Ltd, Deyang (CN); Sichuan Kete Testing Technology Co., Ltd, Deyang (CN)

(72) Inventors: Yonggang Deng, Deyang (CN); Gang Wang, Deyang (CN); Ketao Cai, Deyang (CN); Chi Ma, Deyang (CN); Shundong Tang, Deyang (CN); Rui Wang, Deyang (CN); Shanji Wang, Deyang (CN); Wenbin Chen, Deyang (CN); Wei Zhang, Deyang (CN); Yan Shi, Deyang (CN)

(73) Assignees: Sichuan Hongda Security Technology Service Co., Ltd, Deyang (CN); Sichuan Kete Testing Technology Co., Ltd, Deyang (CN)

( * ) Notice: Subject to any disclaimer, the term of this patent is extended or adjusted under 35 U.S.C. 154(b) by 0 days.

(21) Appl. No.: 18/431,517

(22) Filed: Feb. 2, 2024

(30) Foreign Application Priority Data

Feb. 21, 2023 (CN) .......................... 202310142670.6

(51) Int. Cl.
*F16K 3/26* (2006.01)
*F16K 3/314* (2006.01)

(52) U.S. Cl.
CPC ................ *F16K 3/26* (2013.01); *F16K 3/314* (2013.01)

(58) Field of Classification Search
CPC ............. F16K 3/26; F16K 3/314; E21B 43/12
See application file for complete search history.

(56) References Cited

U.S. PATENT DOCUMENTS

| 5,782,006 A | 7/1998 | Erway |
| 10,386,003 B2 * | 8/2019 | Kerr ................. F16L 55/02781 |
| 2017/0175488 A1 * | 6/2017 | Lisowski ................ E21B 43/08 |

FOREIGN PATENT DOCUMENTS

| CN | 216077071 U | 3/2022 |
| CN | 216788377 U | 6/2022 |

OTHER PUBLICATIONS

Translation of CN 216077071 U; Sun Xiaohai; Liu Yang; Qian Guiqing; Huang Zhaodan; Wang Dong; Zhao Bin; Xia Wenxi; Zhao Yunchun; Mar. 18, 2022.*
Translation of CN 216788377 U; Gu Yupeng; Li Ming; Luo Jicheng; Sun Wenshan; Ma Xiaofei; Jun. 21, 2021.*

* cited by examiner

*Primary Examiner* — Paul J Gray
(74) *Attorney, Agent, or Firm* — Jeenam Park

(57) ABSTRACT

The present invention discloses a choke combination device for gas production. wherein a first boss is arranged on an inner wall of the choke sleeve, a first through hole is formed in the middle of the first boss, a second boss is arranged on an outer peripheral side surface of the choke; the plug is provided with a stepped hole; outer walls of the first cylinder and the second cylinder are in sliding connection with a key groove in the inner wall of the choke sleeve, inner walls of the first cylinder and the second cylinder are in threaded connection with the first shaft section and the second shaft section respectively. The device is simple to replace and operate, which can save the operating time of replacement operation.

5 Claims, 12 Drawing Sheets

CHOKE COMBINATION DEVICE FOR GAS PRODUCTION

CROSS-REFERENCE TO RELATED APPLICATIONS

This application claims priority to Chinese Patent Application No. 202310142670.6, filed on Feb. 21, 2023, which is hereby incorporated by reference in its entirety.

TECHNICAL FIELD

The present invention relates to the technical field of oil and gas production equipment, and specifically is a choke combination device for gas production.

BACKGROUND

A choke is a well head accessory commonly used in the production of a flowing oil and gas well and is used to control a production pressure difference and a yield of the oil and gas well and prevent the oil and gas well from sanding, which affects the final production rate. For a gas production well, the gas flow rate is high, particularly the gas flow rate is higher at a gas outlet of the choke with a throttling effect, impurities carried in the gas often strongly rub the gas outlet to cause the choke to be stabbed to greatly reduce the throttling capacity of the choke, and therefore, the operation of replacing the choke can be involved in the gas production process.

At present, in order to conveniently replace the choke, a T-shaped three-way pipe is usually arranged as a choke sleeve, as shown in FIG. 1, the choke sleeve comprises three open ends, wherein the two oppositely arranged open ends are respectively connected to a plug and a production string, the other open end is communicated with an external conveying string, an annular boss is arranged in the choke sleeve, and the choke is threaded and sealed with the annular boss, so that the produced natural gas is ensured to be throttled by the choke. When the choke is replaced, the valves on a production string and an external conveying string are first closed to isolate the choke sleeve, then the choke sleeve is subjected to pressure relief (a pressure relief valve is not shown in the figure), the plug is disassembled, and a socket wrench is used to rotate the choke to separate the choke from the annular boss, a socket wrench is used to thread a new choke onto the annular boss, and finally the plug is mounted. There are several time-consuming links in these operations, for example, when the choke is disassembled, the socket wrench is sleeved on the choke located in a pipeline, and for another example, when the choke is mounted, the choke is completely aligned with a through hole of the annular boss located in a pipeline. Since these operations are performed deep inside the pipeline and the field of view is limited, repeated attempts are required and time-consuming.

SUMMARY

In order to solve at least one of the problems and save the time for replacing the choke, the present invention provides a choke combination device for gas production.

A specific solution of the present invention is as follows: a choke combination device for gas production comprises a choke, a plug, a three-way choke sleeve, a packing ring, a rotating shaft, a first cylinder, a second cylinder and a drive structure, wherein an annular first boss is arranged on an inner wall of the choke sleeve, a first through hole is formed in the middle of the first boss, one end of the choke passes through the first through hole, the plug is detachably connected to one open end of the choke sleeve, an annular second boss is arranged on an outer peripheral side surface of the choke, and the second boss has a size larger than the first through hole so as to seal the first through hole after the second boss presses the first boss; the plug is provided with a stepped hole passing through a plug body; the rotating shaft comprises a first shaft section, a second shaft section and a third shaft section that are coaxially connected, the second shaft section is positioned between the first shaft section and the third shaft section, outer walls of the first shaft section and the second shaft section are provided with threads in opposite rotating directions, an outer wall of the third shaft section is smooth, and one end of the third shaft section passes through the packing ring and the stepped hole; the first cylinder is configured to drive the second boss to move along a center line of the first boss, a position exists in the moving process such that the second boss is tightly pressed on the first boss, one end of the first cylinder is detachably connected to the choke, the inside of the choke is communicated with the outside of the first cylinder after the connection, an inner wall of the first cylinder is in threaded connection with the first shaft section, and an outer wall of the first cylinder is in sliding connection with a key groove in the inner wall of the choke sleeve; the second cylinder is configured to tightly press the packing ring in the stepped hole so as to seal a gap between the plug and the third shaft section, an inner wall of the second cylinder is in threaded connection with the second shaft section, an outer wall of the second cylinder is in sliding connection with a key groove in the inner wall of the choke sleeve, and one end of the second cylinder is opposite to the packing ring; and the drive structure is configured to drive the rotating shaft to rotate.

In a specific embodiment of the present invention, the first through hole is flared, and an inner diameter of the first through hole gradually increases in a direction from the first boss to the plug, which facilitates easier insertion of the choke into the first through hole.

In the present invention, the first cylinder and the choke are connected in a plurality of manners, such as threaded connection and pin connection, and after connection, a fluid in the choke is communicated with the outside of the first cylinder in a plurality of manners, such as through holes are formed in the first cylinder. In a specific embodiment of the present invention, one end of the first cylinder is connected to a first annular member through a plurality of connecting rods, an inner diameter of the first annular member is smaller than an outer diameter of the second boss, and the first annular member is coaxially sleeved on the outer wall of the choke and is fixedly connected to the choke through a pin.

In a specific embodiment of the present invention, at least two sliding grooves extending along the center line of the first boss are formed in the choke sleeve, the at least two sliding grooves extending along the center line of the first boss are arranged in a circumferential array, and keys corresponding to the sliding grooves are formed on the outer walls of the first cylinder and the second cylinder.

In a specific embodiment of the present invention, the drive structure is a straight rod, a second through hole extending radially along the third shaft section is formed in one end that is of the third shaft section and that is positioned outside the choke sleeve, and one end of the straight rod is inserted into the second through hole.

Further, a thrust bearing is arranged between the straight rod and the plug, and the third shaft section passes through a hollow part of the thrust bearing.

Further, the packing ring is made of graphite materials.

Compared to the conventional technology, the present invention has the following advantages.

(1) The choke is connected to the first cylinder, the second cylinder and the rotating shaft into a whole, the first cylinder and the second cylinder are in sliding connection with a key groove in the inner wall of the choke sleeve, and during use, the choke and the first boss can be completely aligned in a later period only by connecting the first cylinder and the second cylinder with a key groove in the inner wall of the choke sleeve when the choke sleeve opening is in positioned, which can be implemented in one time and reduce the time of trial and error.

(2) The threads on outer walls of the first shaft section and the second shaft section in the rotating shaft are opposite in a rotating direction, and one turn of the rotating shaft can push the choke to move a distance of two turns of threads along the center line of the first boss, so that the time for rotating the rotating shaft can be shortened.

(3) When the choke is loosened by fluid impact during use, a fluid will leak from the gap between the first through hole and the choke. In the existing combination device, production can only be stopped, and the plug is disassembled and then tightened again. However, the choke combination device of the present invention can achieve online operation, and the rotating shaft is just rotated to push the second boss of the choke to further press the first boss of the choke sleeve to achieve sealing.

Figure 1:
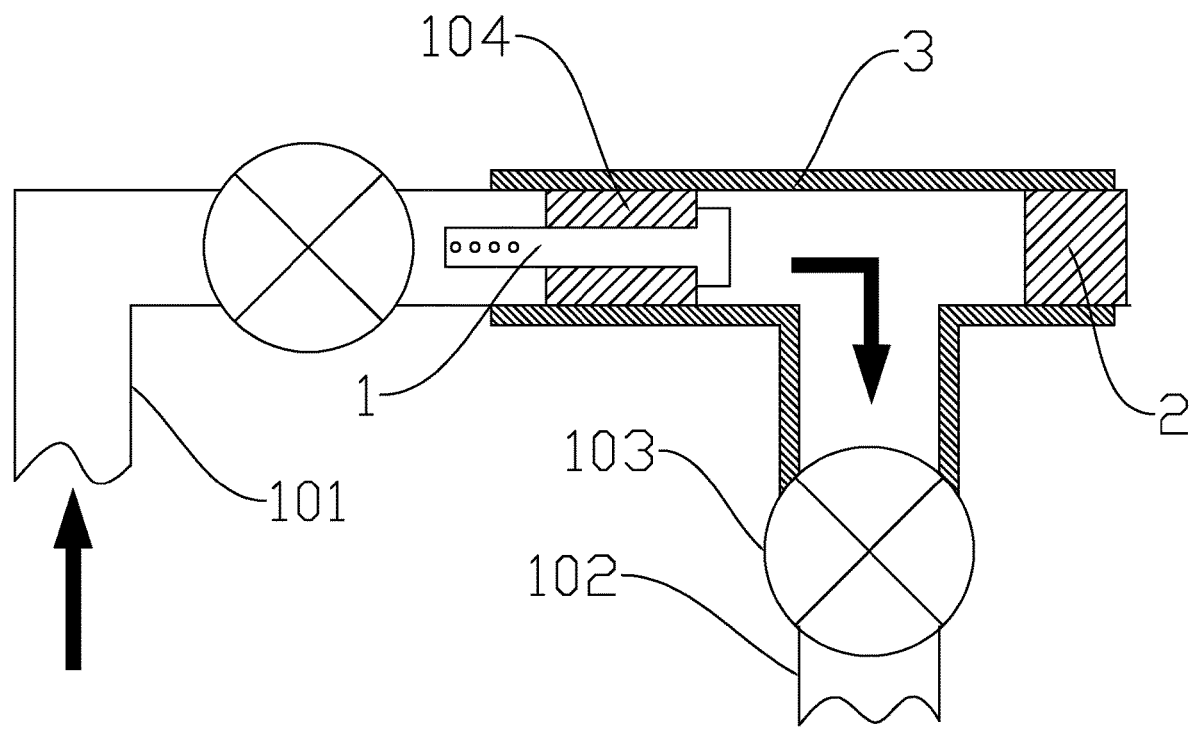
FIG. 1 is a schematic diagram of a choke combination device in the conventional technology in a working state.

In the drawings, 1: choke, 2: plug, 3: choke sleeve, 4: packing ring, 5: rotating shaft, 6: first cylinder, 7: second cylinder, 8: drive structure, 9: thrust bearing, 11: closed end, 12: open end, 13: second boss, 14: gas outlet, 31: first open end, 32: second open end, 33: third open end, 34: first boss, 35: sliding groove, 41: stepped hole, 51: first shaft section, 52: second shaft section, 53: third shaft section, 61: limiting key, 62: connecting rod, 63: first annular member, 64: pin, 101: production string, 102: external conveying string, 103: valve, 104: annular boss, and 341: first through hole.

DESCRIPTION OF EMBODIMENTS

The present invention is further described in detail below with reference to the embodiments and drawings; however, the embodiments of the present invention are not limited thereto.

Embodiment 1

Figure 2:
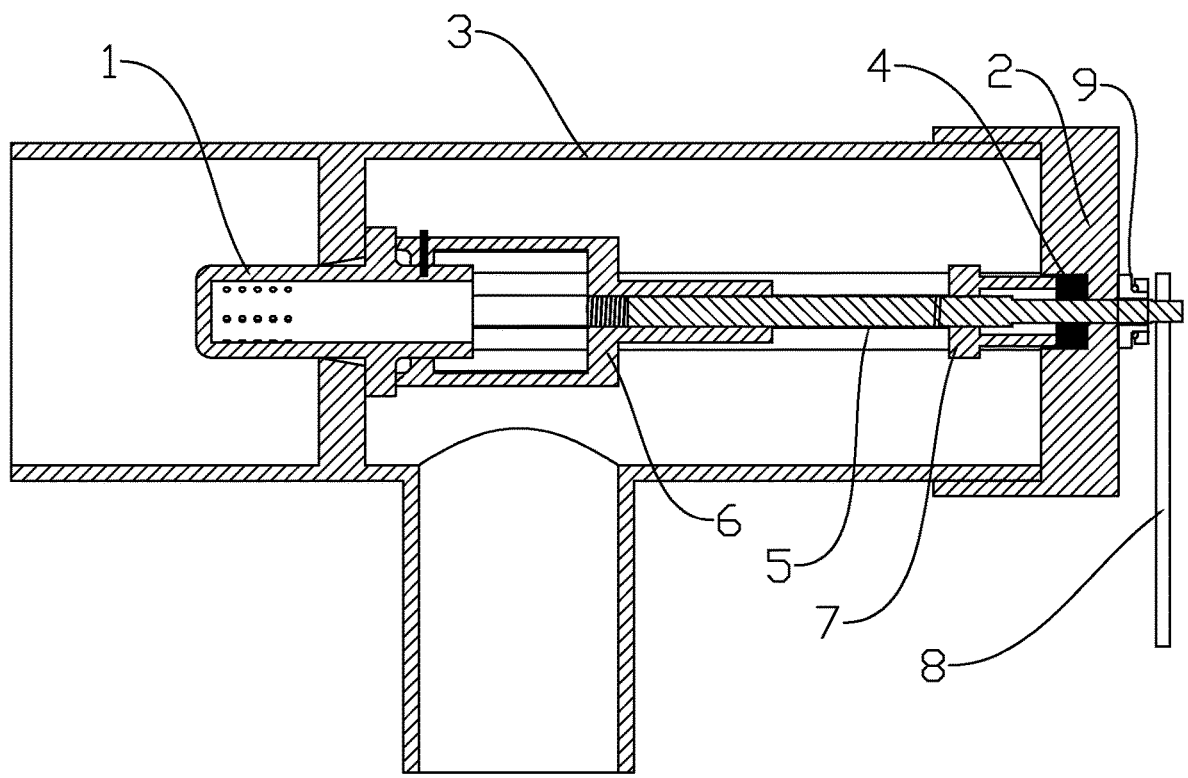
FIG. 2 is a cross-sectional view of an overall structure of a choke combination device according to Embodiment 1 of the present invention.

Referring to FIG. 2, the choke combination device for gas production comprises a choke 1, a plug 2, a choke sleeve 3, a packing ring 4, a rotating shaft 5, a first cylinder 6, a second cylinder 7, a drive structure 8, and a thrust bearing 9.

Figure 3:
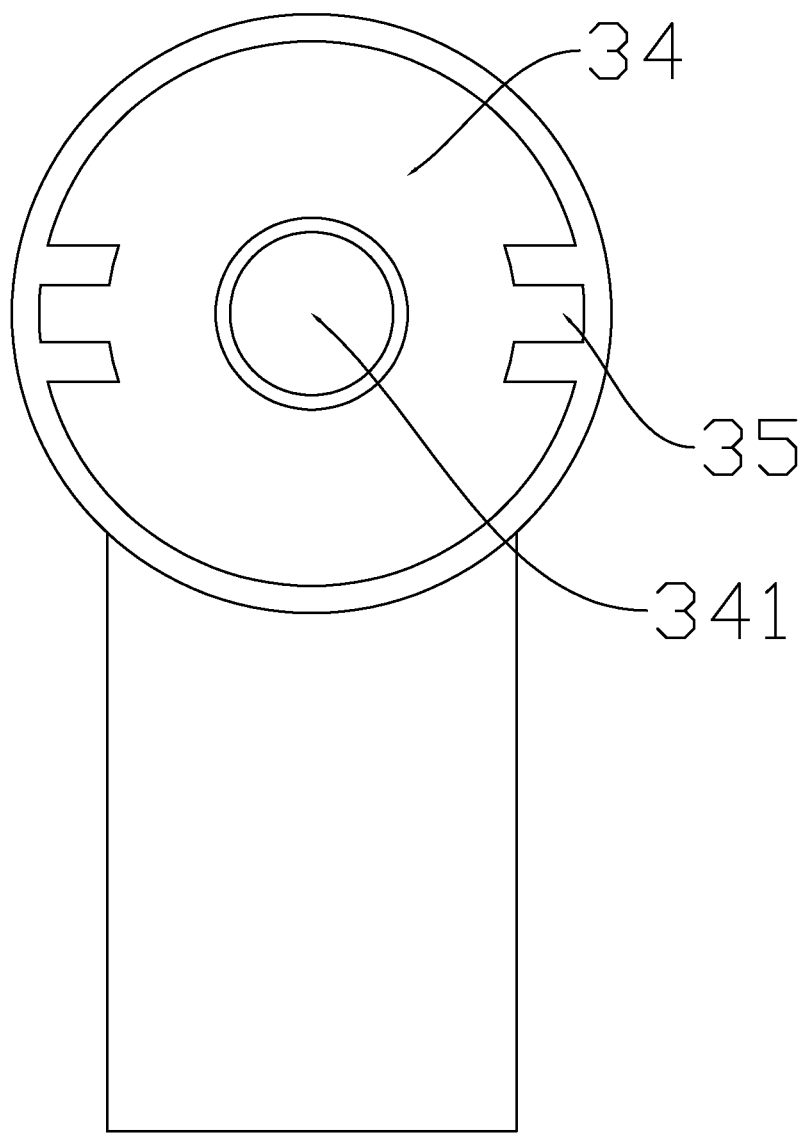
FIG. 3 is a side view of a choke sleeve according to Embodiment 1 of the present invention.
Figure 4:
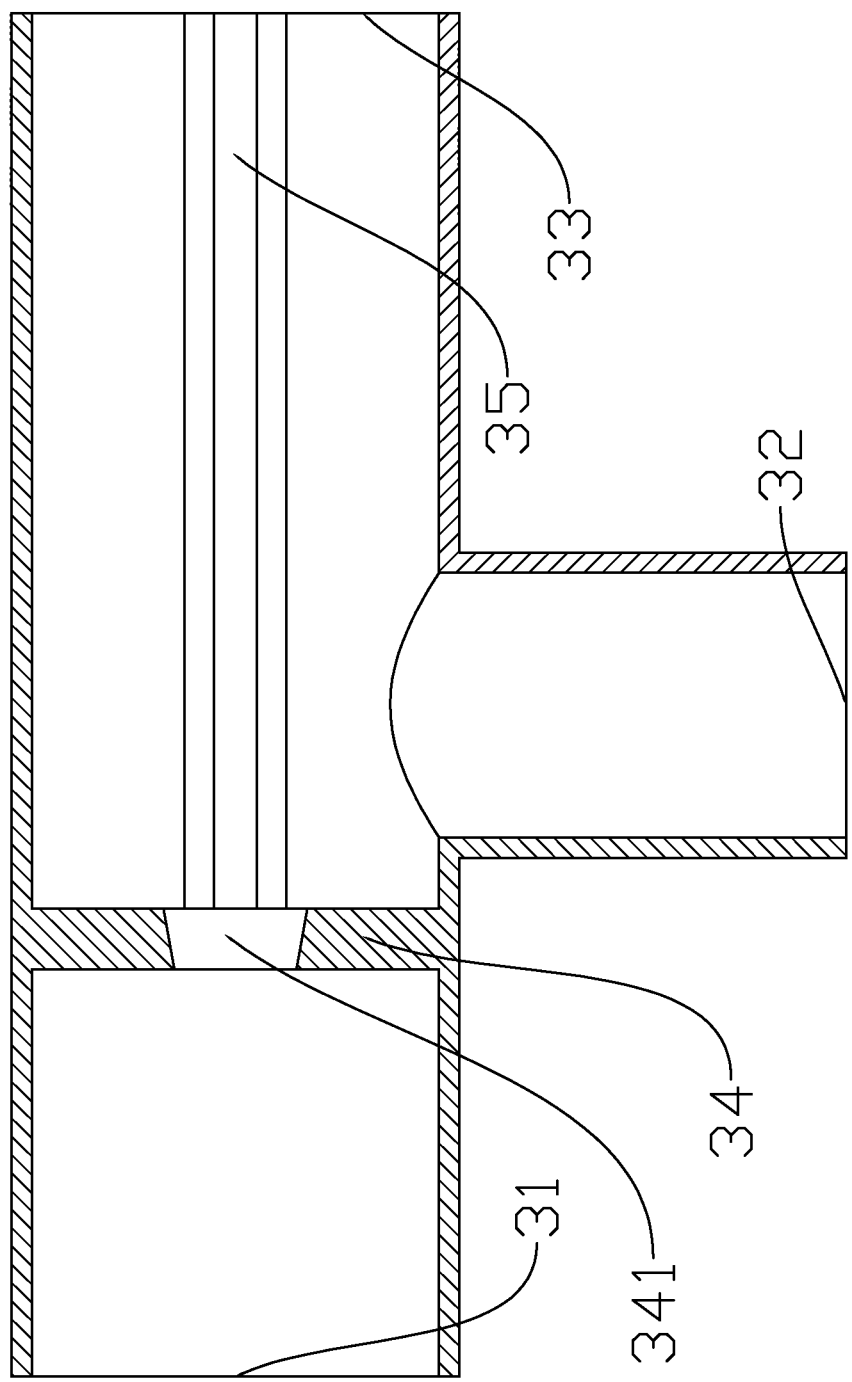
FIG. 4 is a cross-sectional view of a choke sleeve according to Embodiment 1 of the present invention.

Referring to FIGS. 3 and 4, the choke sleeve 3 is a T-shaped three-way pipe, and comprises three open ends arranged from left to right: a first open end 31, a second open end 32, and the third open end 33. The first open end 31 and the third open end 33 are oppositely arranged, when the choke combination device is used, the first open end 31 is communicated with the production string 101 and configured to introduce natural gas produced by a stratum into the choke combination device, the second open end 32 is connected to an external conveying string 102 and configured to convey the natural gas after the choke 1 is depressurized to downstream, the plug 2 is in threaded connection with the third open end 33, and the choke 1 in the choke sleeve 3 can be replaced after the plug 2 is disassembled. An annular first boss 34 is arranged on an inner wall of the choke sleeve 3, the first boss 34 is positioned between the first open end 31 and the second open end 32, and a first through hole 341 for mounting the choke 1 is formed in the middle of the first boss 34. Two sliding grooves 35 extending along a center line of the first through hole 341 are arranged in the inner wall of the choke sleeve 3 between the first boss 34 and the third open end 33, and the two sliding grooves 35 are symmetrically arranged and used to be in sliding connection with key grooves of the first cylinder 6 and the second cylinder 7, so that the first cylinder 6 and the second cylinder 7 are limited to move along the center line of the first through hole 341.

Figure 5:
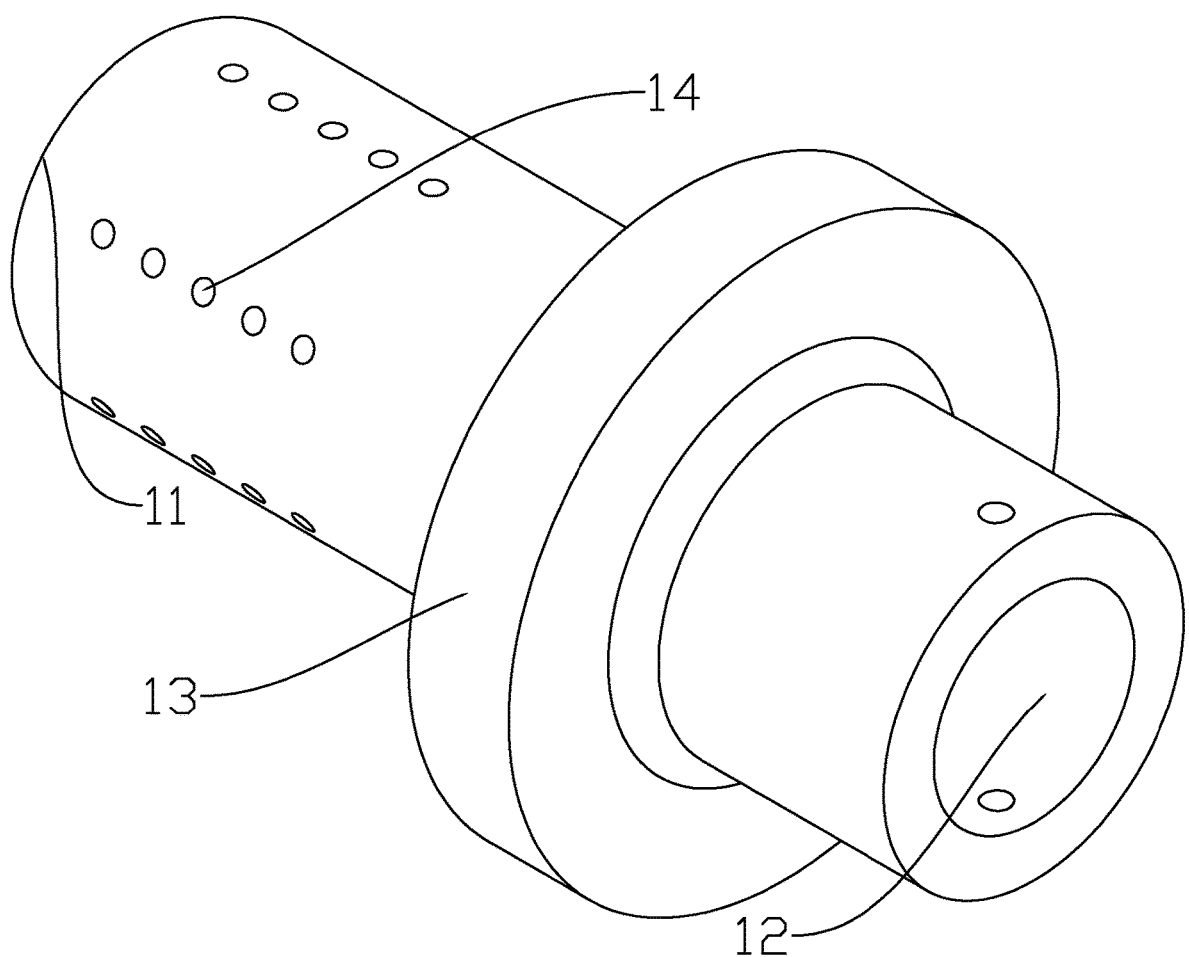
FIG. 5 is a schematic diagram of a structure of a choke sleeve according to Embodiment 1 of the present invention.

Referring to FIG. 5, the choke 1 is a tubular structure, one end of which is closed and called a closed end 11, and the other end of which is opened and called an open end 12, the middle of an outer peripheral side surface of the choke 1 is provided with an annular second boss 13 extending radially outward along a choke body, and a through hole passing through the body is formed in a pipe wall that is of the choke 1 and that is between the closed end 11 and the second boss 13 and called a gas outlet 14; the size of the second boss 13 is larger than that of the first through hole 341, so that the first through hole 341 can be sealed after the closed end 11 of the choke 1 passes through the first through hole 341 and the second boss 13 tightly presses the first boss 341; therefore, the produced natural gas must be throttled through the gas outlet 14.

Figure 6:
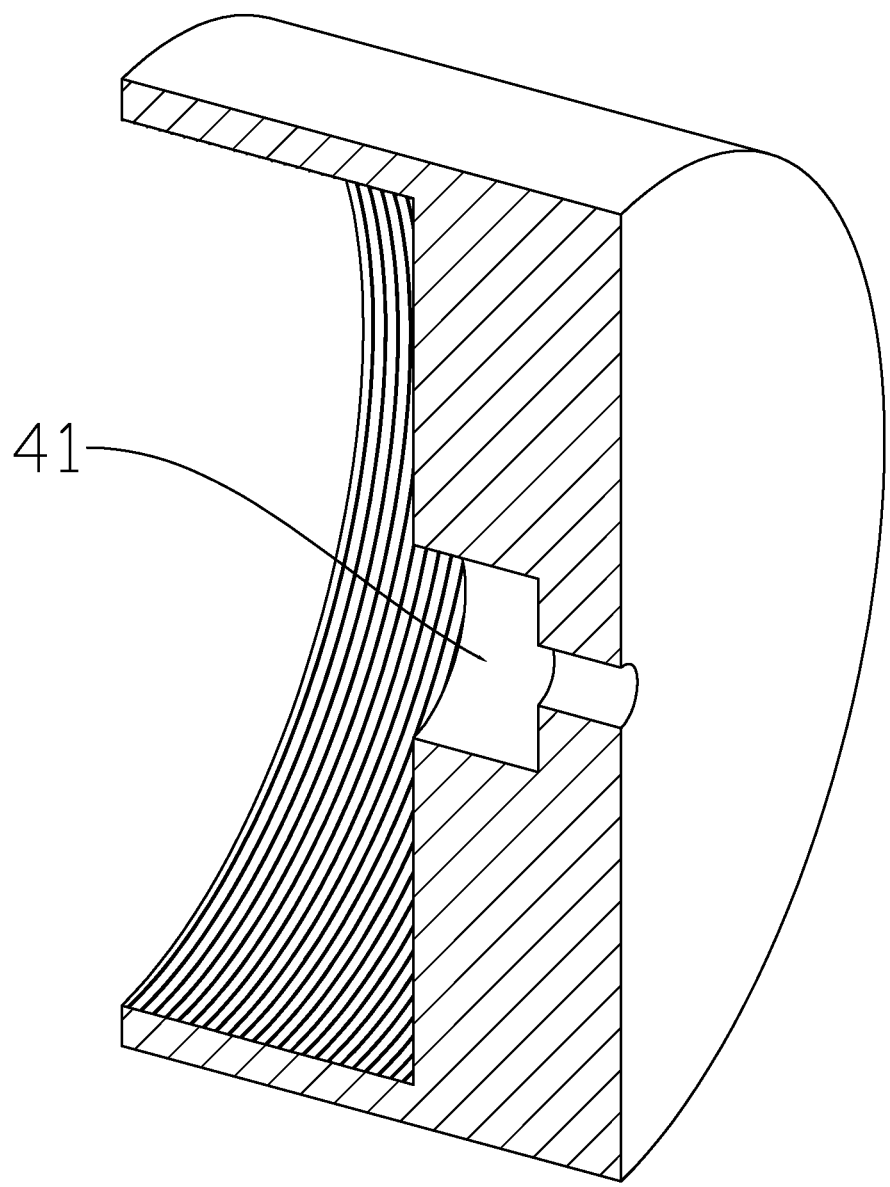
FIG. 6 is a cross-sectional view of a plug according to Embodiment 1 of the present invention.

Referring to FIG. 6, a cross section of the plug 4 is circular, the plug 4 comprises a threaded connection section for being in threaded connection with the third open end 33, a stepped hole 41 passing through the body is formed in a bottom surface of the plug 4 for accommodating the packing ring 4, the packing ring 4 is made of graphite materials and has a good sealing effect, the packing ring 4 and the stepped hole 41 are coaxially arranged, and the bottom surface of the packing ring 4 presses the step of the stepped hole 41.

Figure 7:
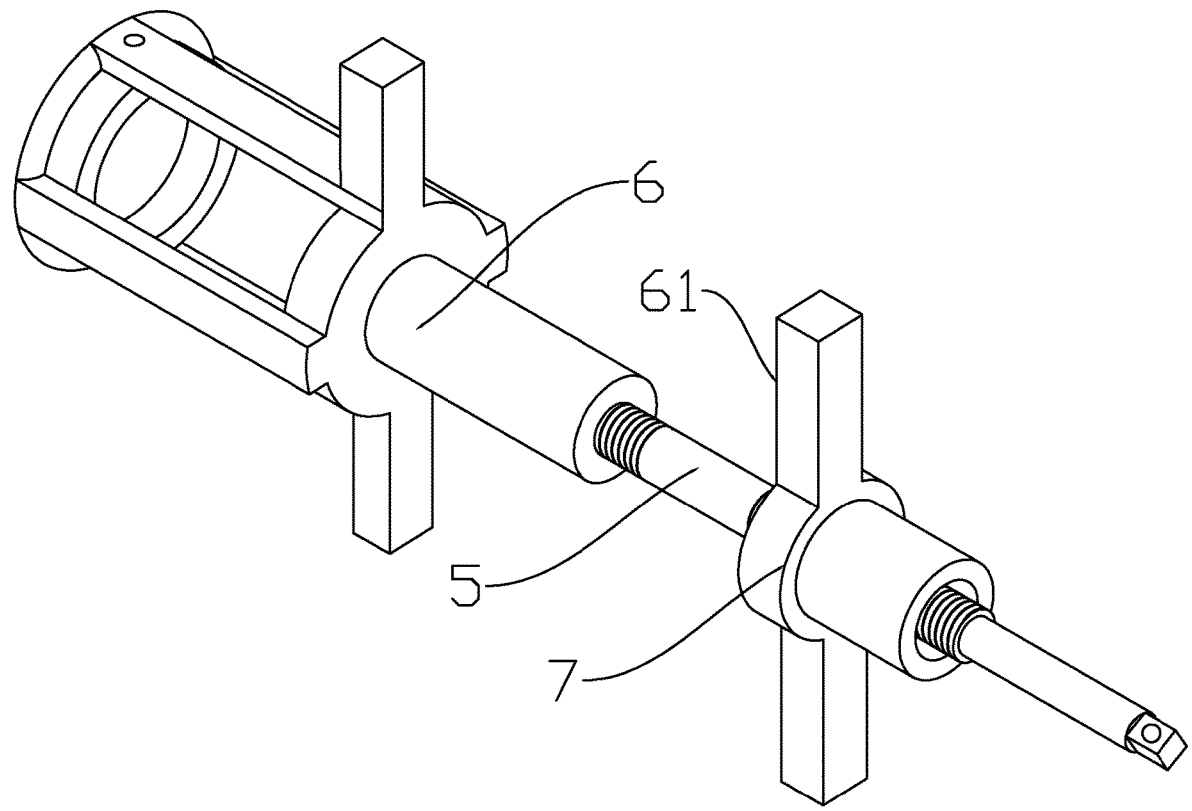
FIG. 7 is a schematic diagram of an overall structure of a rotating shaft, a first cylinder and a second cylinder according to Embodiment 1 of the present invention.
Figure 8:
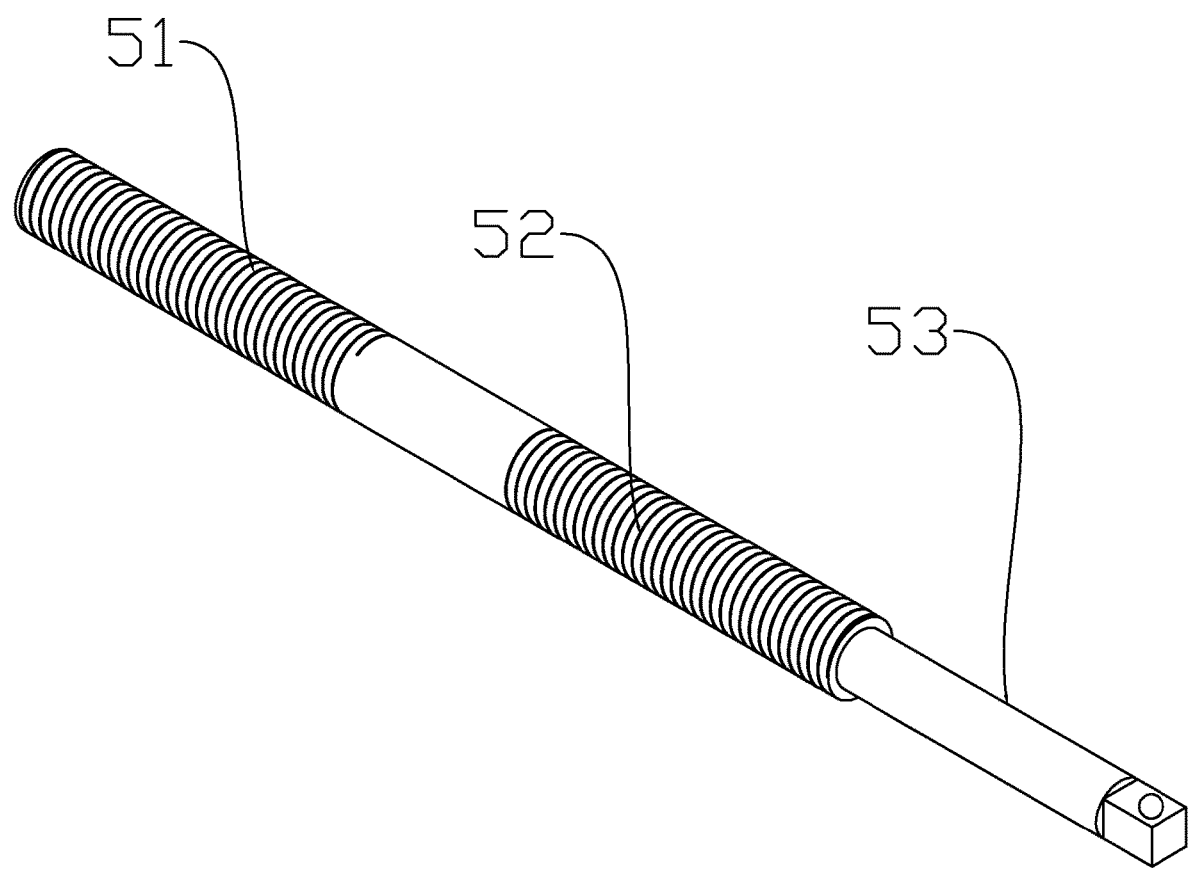
FIG. 8 is a schematic diagram of a structure of a rotating shaft according to Embodiment 1 of the present invention.

Referring to FIGS. 7 and 8, the rotating shaft 5 is integrally arranged along a center line of the first through hole 341, and comprises a first shaft section 51, a second shaft section 52 and a third shaft section 53 that are coaxially connected, the second shaft section 52 is positioned between the first shaft section 51 and the third shaft section 53, outer walls of the first shaft section 51 and the second shaft section 52 are provided with threads in opposite rotating directions, an outer wall of the third shaft section 53 is smooth, and one end of the third shaft section passes through the packing ring 4 and the stepped hole 41.

Figure 9:
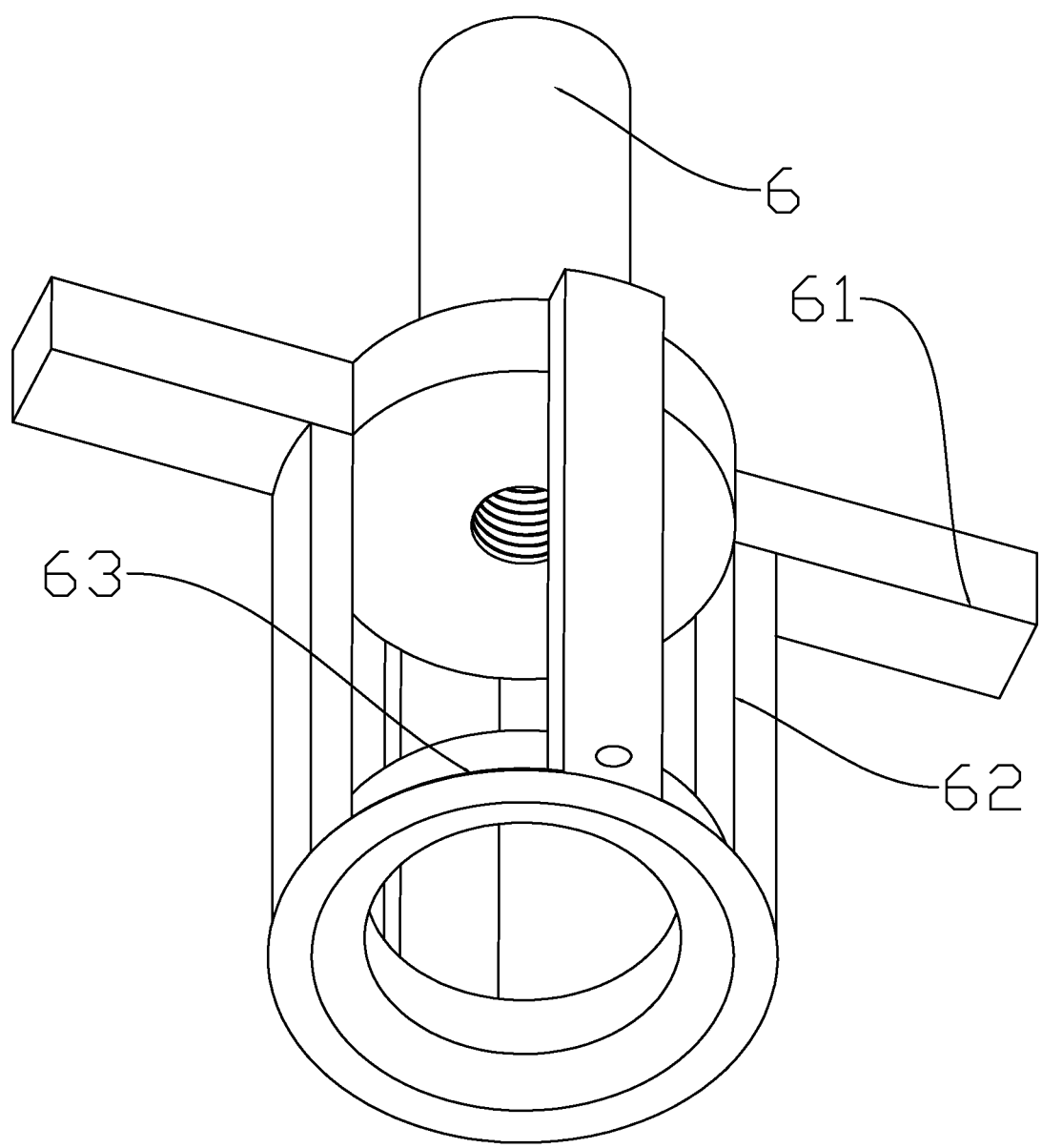
FIG. 9 is a perspective view of a first cylinder according to Embodiment 1 of the present invention.
Figure 10:
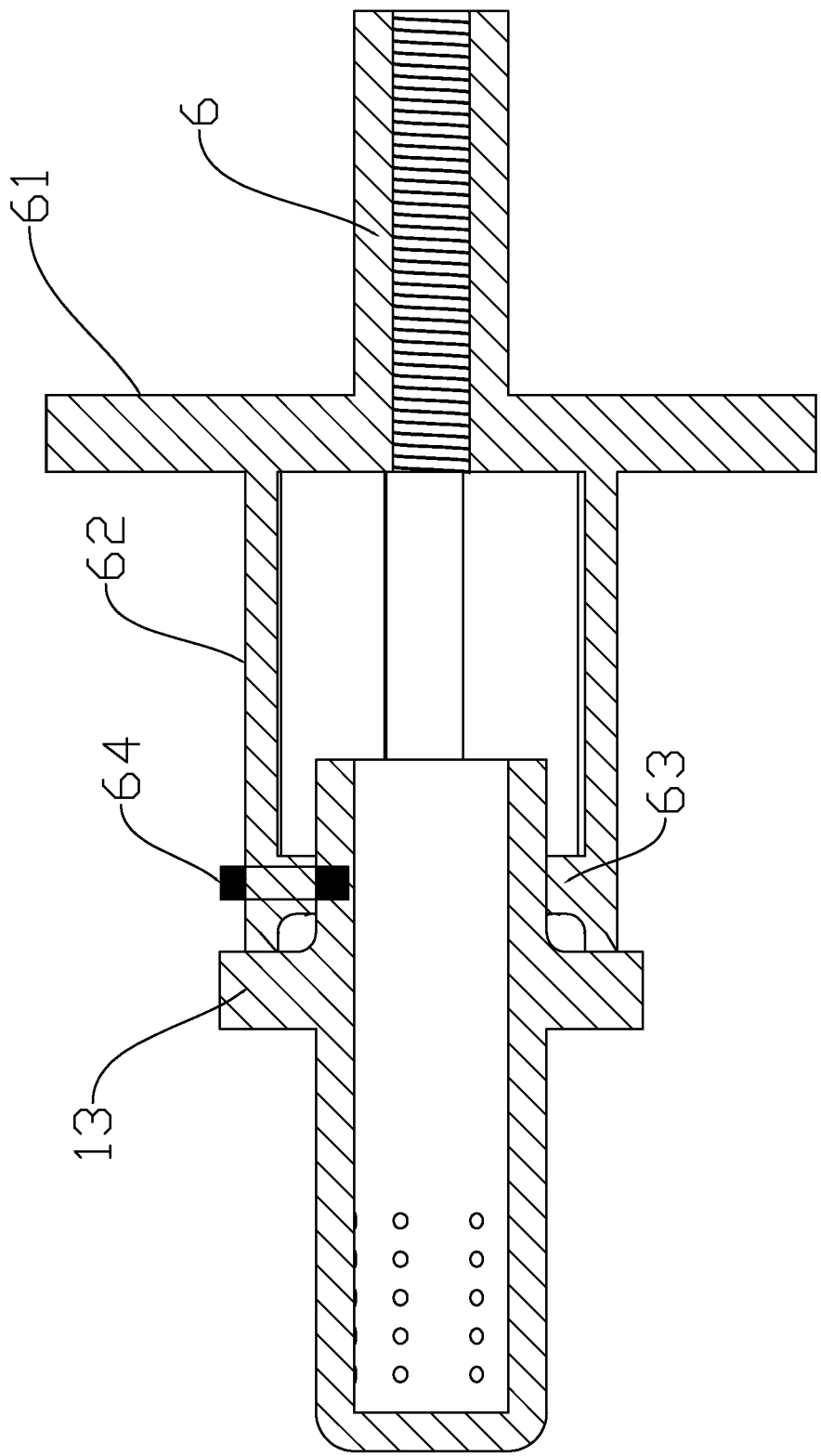
FIG. 10 is a cross-sectional view of a combined structure of a first cylinder and a choke according to Embodiment 1 of the present invention.

Referring to FIGS. 9 and 10, the first cylinder 6 is used to drive the choke 1 to move along the center line of the first through hole 341, and during the moving process, when the second boss 13 presses the first boss 341, the choke 1 is mounted. Specifically, the inner wall of first cylinder 6 is provided with threads for being in threaded connection with the first shaft section 51, the outer wall of the first cylinder 6 is provided with two limiting keys 61 extending radially outward, and the two limit keys 61 fit two sliding grooves 35 in the choke sleeve 3 to achieve key-groove connection. Therefore, the first cylinder 6 moves along the center line of the first through hole 341 when the rotating shaft 5 is rotated. One end of the first cylinder 6 is connected to a first annular member 63 through four connecting rods 62, an inner diameter of the first annular member 63 is smaller than an outer diameter of the second boss 13, and the first annular member 63 is coaxially sleeved on the outer wall of the open end 12 of the choke 1 and is fixedly connected to the choke 1 through a pin 64.

Figure 11:
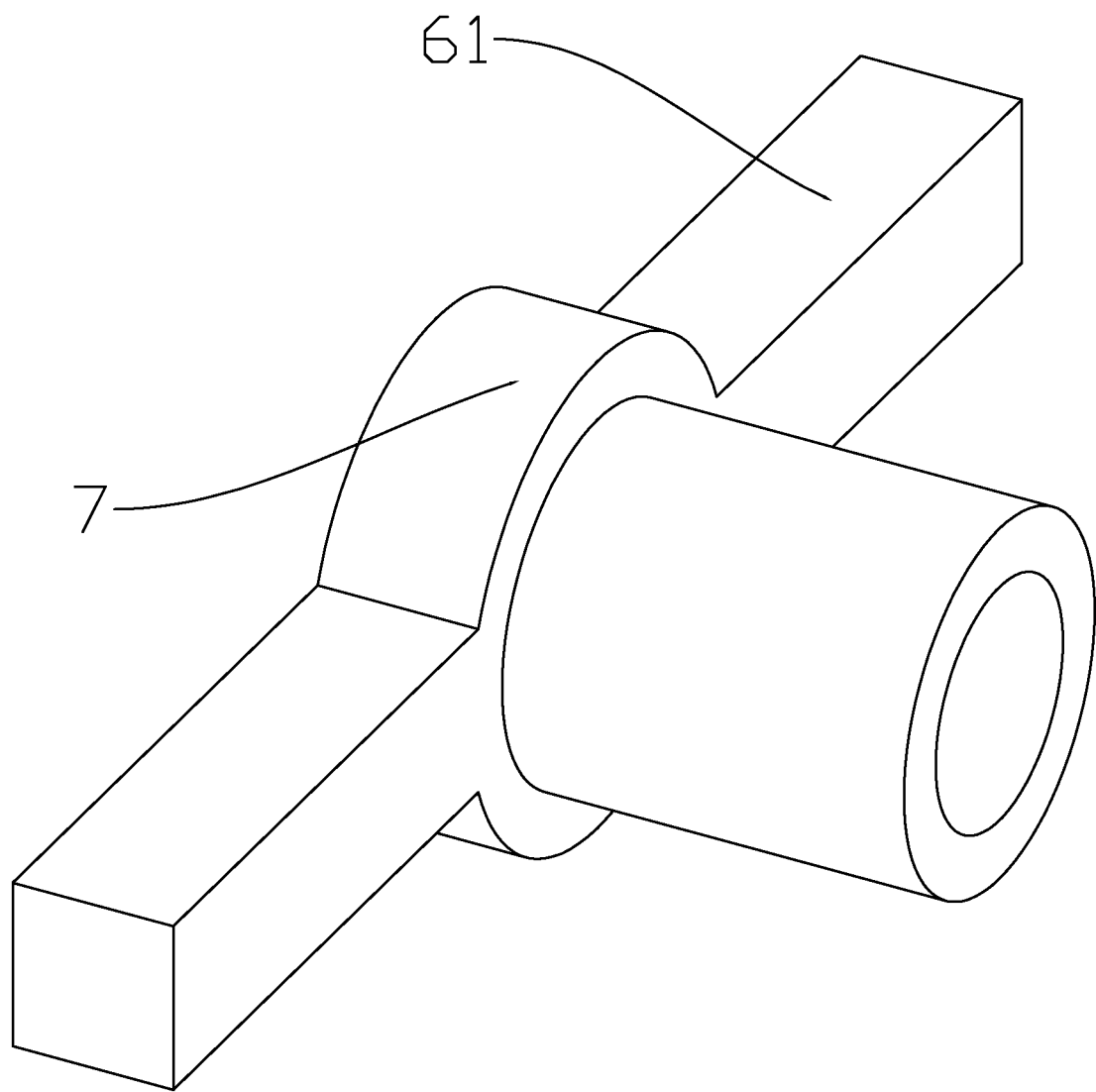
FIG. 11 is a perspective view of a second cylinder according to Embodiment 1 of the present invention.
Figure 12:
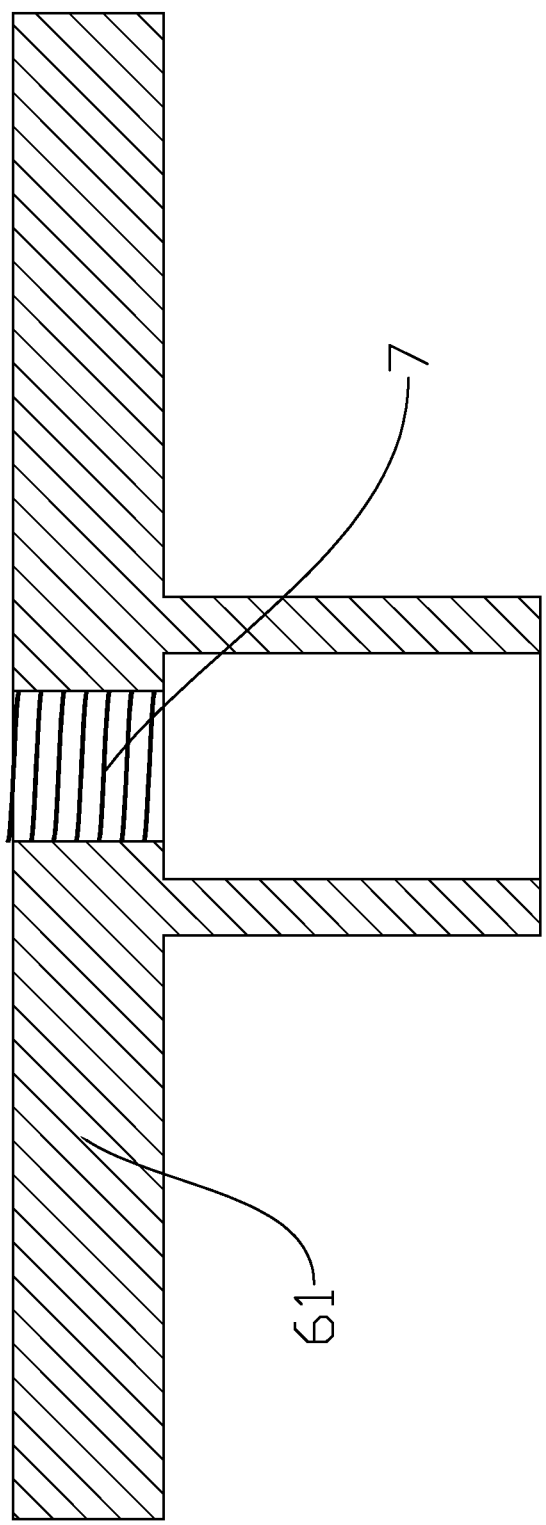
FIG. 12 is a cross-sectional view of a second cylinder according to Embodiment 1 of the present invention.

Referring to FIGS. 11 and 12, the second cylinder 7 is configured to tightly press the packing ring 4 into the stepped hole 41 to seal the gap between the plug 2 and the third shaft section 53. Specifically, the inner wall of the second cylinder 7 is provided with threads for being in threaded connection with the second shaft section 52, the outer wall of the second cylinder 7 is provided with two limiting keys 61 extending radially outward, and the two limiting keys 61 fit the two sliding grooves 35 in the choke sleeve 3 to achieve the key-groove connection, so that the second cylinder 7 moves along the center line of the first through hole 341 when the rotating shaft 5 is rotated, one end of the second cylinder 1 is opposite to the packing ring 4, and the packing ring 4 can be extruded when the second cylinder 1 moves along the center line of the first through hole 341 along a direction of the plug 2; therefore, the packing ring 4 radially expands to seal a gap between the third shaft section 53 and the stepped hole 41.

The drive structure 8 is a straight rod, a second through hole 531 extending radially along the third shaft section 53 is formed in one end that is of the third shaft section 53 and that is positioned outside the choke sleeve 3, and one end of the straight rod is inserted into the second through hole 531 and used as a handle of the rotating shaft 4.

In addition, the inner diameter of the first through hole 341 gradually increases in a direction from the first boss 34 to the plug 2, which facilitates the choke 1 to be more easily inserted into the first through hole 341, the thrust bearing 9 is arranged between the straight rod and the plug 2, and the third shaft section 53 passes through the hollow part of the thrust bearing 9.

According to the combination device, when the choke 1 is replaced, the choke sleeve 3 is isolated and subjected to pressure relief, then the rotating shaft 5 is rotated reversely to enable the first cylinder 6 and the second cylinder 7 to be close to each other, the packing ring 4 is not tightly pressed by the second cylinder 7, the first boss 34 is not tightly pressed by the second boss 13, then the plug is disassembled, and the choke 1 is taken out from the choke sleeve 3; after the new choke 1 is connected to the first annular member 63 through a pin, the rotating shaft 5 is pulled to enable the second cylinder 7 to contact the packing ring 4, the limiting key 61 is placed in the sliding groove 35, then the plug is fastened, and the rotating shaft 5 is rotated forwardly to seal the first through hole 341 and the stepped hole 41. Because the threads on outer walls of the first shaft section 51 and the second shaft section 52 in the rotating shaft are opposite in a rotating direction, and the second cylinder 7 contacts the packing ring 4 during mounting, so that one turn of the rotating shaft 4 can push the choke 1 to move a distance of two turns of threads along the center line of the first through hole 341 in the mounting process, and the time for rotating the rotating shaft can be shortened. The device has the advantages that the operation of replacing the choke 1 is simple, and there is no need to perform relatively delicate operations on the choke sleeve 3, which avoids the increase of operation difficulty due to obstruction of the visual range; and compared with the conventional choke combination device, the device can greatly reduce the operation time in the replacement process. Meanwhile, in the use process, after the first through hole 341 leaks due to vibration or other reasons, online leakage plugging operation is performed through rotating the rotating shaft 4 to avoid shutdown.

The above descriptions are merely preferred specific embodiments of the present invention, however, the protection scope of the present invention is not limited thereto, and any modifications and substitutions that can be easily conceived by those skilled in the art within the technical scope disclosed by examples of the present invention shall fall within the protection scope of the present invention.

What is claimed is:

1. A choke combination device for gas production, comprising: a choke, a plug and a three-way choke sleeve, wherein an annular first boss is arranged on an inner wall of the choke sleeve, a first through hole is formed in the middle of the first boss, one end of the choke passes through the first through hole, the plug is detachably connected to one open end of the choke sleeve, an annular second boss is arranged on an outer peripheral side surface of the choke, and the second boss has a size larger than the first through hole so as to seal the first through hole after the second boss presses the first boss; the plug is provided with a stepped hole passing through a plug body; the choke combination device further comprises:
   a packing ring;
   a rotating shaft, wherein the rotating shaft comprises a first shaft section, a second shaft section and a third shaft section that are coaxially connected, the second shaft section is positioned between the first shaft section and the third shaft section, outer walls of the first shaft section and the second shaft section are provided with threads in opposite rotating directions, an outer wall of the third shaft section is smooth, and one end of the third shaft section passes through the packing ring and the stepped hole;
   a first cylinder, wherein the first cylinder is configured to drive the second boss to move along a center line of the first boss, a position exists in the moving process such that the second boss is tightly pressed on the first boss, one end of the first cylinder is detachably connected to the choke, the inside of the choke is communicated with the outside of the first cylinder after the connection, an inner wall of the first cylinder is in threaded connection with the first shaft section, and an outer wall of the first cylinder is in sliding connection with a key groove in the inner wall of the choke sleeve;

a second cylinder, wherein the second cylinder is configured to tightly press the packing ring in the stepped hole so as to seal a gap between the plug and the third shaft section, an inner wall of the second cylinder is in threaded connection with the second shaft section, an outer wall of the second cylinder is in sliding connection with a key groove in the inner wall of the choke sleeve, and one end of the second cylinder is opposite to the packing ring; and a drive structure configured to drive the rotating shaft to rotate;

wherein one end of the first cylinder is connected to a first annular member through a plurality of connecting rods, an inner diameter of the first annular member is smaller than an outer diameter of the second boss, and the first annular member is coaxially sleeved on the outer wall of the choke and is fixedly connected to the choke through a pin.

2. The choke combination device for gas production according to claim 1, wherein an inner diameter of the first through hole increases gradually from the first boss to the plug.

3. The choke combination device for gas production according to claim 1, wherein at least two sliding grooves extending along the center line of the first boss are formed in the choke sleeve, the at least two sliding grooves extending along the center line of the first boss are arranged in a circumferential array, and keys corresponding to the sliding grooves are formed on the outer walls of the first cylinder and the second cylinder.

4. The choke combination device for gas production according to claim 1, wherein the drive structure is a straight rod, a second through hole extending radially along the third shaft section is formed in one end that is of the third shaft section and that is positioned outside the choke sleeve, and one end of the straight rod is inserted into the second through hole.

5. The choke combination device for gas production according to claim 4, wherein a thrust bearing is arranged between the straight rod and the plug, and the third shaft section passes through a hollow part of the thrust bearing.

\* \* \* \* \*